Aug. 15, 1967     O. L. RICE     3,335,739

VALVE

Filed Dec. 3, 1964

INVENTOR
ORVAL L. RICE

BY Dodge and Sons

ATTORNEYS

United States Patent Office 3,335,739
Patented Aug. 15, 1967

3,335,739
VALVE
Orval L. Rice, Kalamazoo, Mich., assignor to The New York Air Brake Company, a corporation of New Jersey
Filed Dec. 3, 1964, Ser. No. 415,578
2 Claims. (Cl. 137—115)

This invention relates to hydraulic actuation systems employing double-acting motors of the differential area type.

Systems of this kind are of general utility and usually include a pump, a tank or reservoir, an actuating cylinder or ram, and a three-position directional control valve which serves selectively to connect one end of the cylinder with the pump while connecting the remaining end with the tank. Since the head end of the cylinder has the larger effective area, this end usually is pressurized during the working stroke. In some cases, for example, systems used to move the ejector of an earth-moving scraper, the load imposed on the cylinder varies greatly as the cylinder moves on its working stroke, and consequently the full force-developing capability of the cylinder is not always required. Because of this, these systems frequently include a regeneration device that functions automatically during the working stroke to selectively connect the rod end of the cylinder with the head end or with the directional control valve depending upon whether the load pressure in the head end is low or high, respectively. Inclusion of this device enables the cylinder to move at a higher rate of speed under low load conditions, while at the same time insuring that the cylinder will develop the maximum force under high load conditions.

The regenerative device normally is biased to the high speed position, in which the regeneration path is open, and is shifted to the low speed position as the load pressure rises. Since the load pressure decreases and increases when the regeneration path is closed and opened, respectively, it is essential to stable operation of the regenerative device that it initiate low speed operation at a pressure substantially higher than that at which it re-establises high speed operation. In the past, this differential has been produced by providing two pressure-responsive reaction surfaces of different areas for urging the regenerative device toward its low speed position; the surface having the smaller area being effective under high speed conditions to close the regeneration path when the pressure reaches a high level, and the surface having the larger area being effective under low speed conditions to maintain the regeneration path closed until the load pressure decreases to a low value. The ratio of the areas of the large and small reaction surfaces determines the magnitude of the differential, and, since this ratio is set by design, the differential can be changed only by replacing or redesigning parts of the regenerative device.

The object of this invention is to provide an improved regenerative device which allows the differential between the pressures that initiate high and low speed operation to be varied.

The preferred embodiment of the invention is described herein in detail with reference to the accompanying drawing in which.

Figure 2:
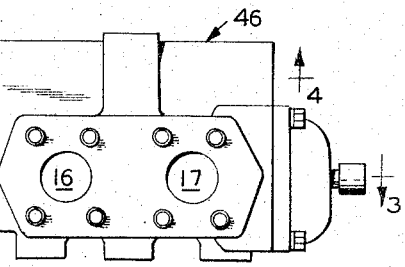
FIG. 2 is a plan view of the preferred regenerative device.
Figure 3:
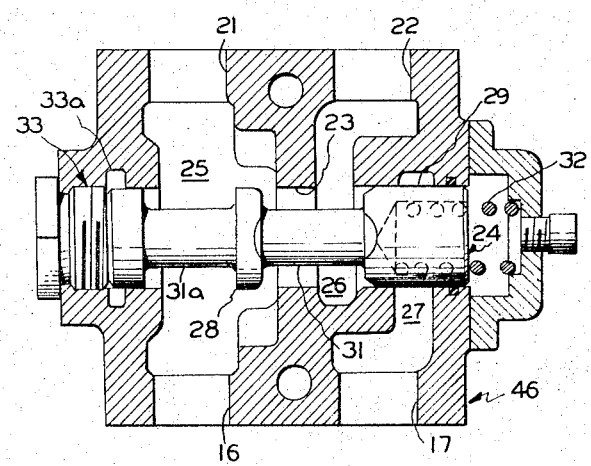
Figure 4:
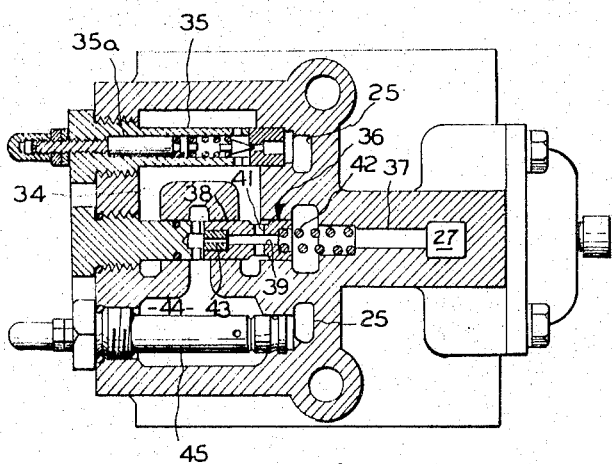

FIGS. 3 and 4 are sectional views taken on lines 3—3 and 4—4, respectively, of FIG. 2.

Figure 1:
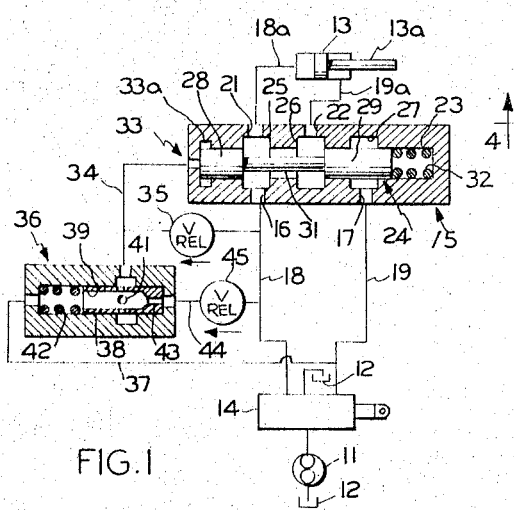
FIG. 1 is a schematic diagram of a typical actuation system incorporating the invention.

As shown in FIG. 1, the actuation system includes a pump 11, tank 12, double-acting, differential area cylinder 13, and a three-position directional control valve 14. Interposed in the conduits connecting the directional control valve 14 with the cylinder 13 is a by-pass or shuttle valve 15 having a pair of ports 16 and 17 which are connected with the conduits 18 and 19, respectively, leading to the valve 14, and a second pair of ports 21 and 22 which are connected with the conduits 18a and 19a, respectively, leading to the opposite ends of cylinder 13. The by-pass valve 15 contains a valve bore 23 which receives the sliding valve plunger 24 and which is encircled by three longitudinally spaced, annular flow chambers 25–27; the chamber 25 providing continuous communication between ports 16 and 21, and the chambers 26 and 27 communicating, respectively, with ports 22 and 17. Valve plunger 24 is formed with a pair of valve lands 28 and 29 which are separated by an annular peripheral groove 31, and is shiftable in bore 23 between the illustrated high speed position and a low speed position by coil compression spring 32 and a piloted motor 33. This motor 33 includes a working chamber 33a and a movable element which is defined by the left end of the valve plunger 24.

The working chamber 33a of motor 33 is connected with conduit 18 by conduit 34 and relief valve 35, and is connected with conduit 19 by conduit 34, vent valve 36 and conduit 37. The vent valve 36 includes a tubular valve element 38 which is formed with axial and radial passages 39 and 41, respectively, and which is biased to the illustrated vent position, in which these passages interconnect conduits 34 and 37, by a coil compression spring 42. At its right end, the axial bore 39 is formed to define a metering orifice 43 which, together with conduit 44, relief valve 45 and conduit 37, constitute a flow path interconnecting conduits 18 and 19. The opposite ends of valve element 38 are subject to the pressures upstream and downstream, respectively, of orifice 43. Therefore, when relief valve 45 is open, the valve element 38 shifts to the left to block radial passages 41 and interrupt communication between conduits 34 and 37. While the relief valves 35 and 45 may be structurally identical, valve 35 is set for a higher cracking pressure. In the illustrated system it is assumed that the ratio of the areas of the head and rod ends of cylinder 13 is 2:1, and that it is required that the regeneration path be closed at a load pressure of 2000 p.s.i. Therefore, in this case relief valves 35 and 45 are adjusted to open at pressures of 2000 and 800 p.s.i., respectively.

When the directional control valve 14 is in its neutral position, it unloads pump 11 to tank 12 and blocks each of the conduits 18 and 19. At this time, cylinder 13 is at rest. In order to extend the cylinder, valve 14 is shifted to a second position in which the unloading path is closed and conduits 18 and 19 are connected with pump 11 and tank 12, respectively. This opens a supply path from pump 12 to the head end of cylinder 13 through conduit 18, port 16, annular chamber 25, port 21 and conduit 18a. If the load acting on cylinder 13 is small, valve plunger 24 will be in its high speed position. Therefore, the oil which is displaced from the rod end of cylinder 13, and which returns to annular chamber 26 through conduit 19a and port 22, will pass through plunger groove 31 to annular chamber 25 and supplement the supply flow from pump 11.

When the load pressure in the head end of cylinder 13 rises to the cracking pressure of relief valve 45, this valve opens and creates a pilot flow from conduit 18 to tank 12 through a path including conduit 44, metering orifice 43, axial bore 39, conduits 37 and 19, and directional control valve 14. The pressure differential developed across orifice 43 by this flow shifts tubular valve element 38 of vent valve 36 to the left and thus blocks radial passages 41. As a result, the vent path from working chamber 33a to tank 12 is closed. When the pressure in conduit 18 reaches the value at which low speed operation is to commence, relief valve 35 opens and transmits this pressure to working chamber 33a. Motor 33 now shifts valve plunger 24 to the right against the opposing bias of spring 32, thereby causing land 28 to interrupt communication between chambers 25 and 26 and causing plunger groove 31 to interconnect annular chambers 26 and 27. Since the two sides of cylinder 13 are now isolated from each other, and the rod end is vented, the cylinder now is able to develop its maximum shifting force.

It will be observed that when valve 15 shifts to its low speed position, and vents the rod end of cylinder 13, the pressure in the head end will decrease drastically. The magnitude of this decrease is a function of the ratio the area of the head end of cylinder 13 to the area of the piston rod 13a, and in the illustrated embodiment it is 1000 p.s.i. This change in pressure will cause relief valve 35 to close, but since relief valve 45 remains open until the pressure decreases to 800 p.s.i., vent valve 36 stays in its closed position and, in effect, hydraulically locks motor 33. Therefore, the change in load pressure which accompanies the conversion from high speed operation to low speed operation does not cause valve plunger 24 to shift back to its illustrated position. As a result, instability of the valve 15 is avoided.

If the load acting on cylinder 13 should now decrease to a level which causes the pressure in the head end of the cylinder to drop to 800 p.s.i., relief valve 45 will close and cut off the pilot flow through metering orifice 43. As a result, spring 42 will return valve element 38 to its illustrated position and reopen the vent path from working chamber 33a to tank 12 defined by conduit 34, radial and axial passages 41 and 39, conduits 37 and 19, and directional control valve 14. Opening of this path relieves the hydraulic lock at motor 33 and permits spring 32 to return valve plunger 24 to the illustrated high speed position. As soon as the two ends of cylinder 13 are interconnected, the pressure in conduit 18 rises to 1600 p.s.i. and relief valve 45 again opens. This causes vent valve 36 to close, but, since the pressure is still 400 p.s.i. below the cracking pressure of relief valve 35, by-pass valve 15 remains in its high speed position. The system will continue to operate at high speed until the load pressure again increases to 2000 p.s.i. or the cylinder reaches the end of its stroke.

In order to retract the cylinder 13, the operator shifts directional control valve 14 to the third operative position in which conduit 19 is connected to pump 11 and conduit 18 is vented to tank 12. The pressure in conduit 19 now rises, and, since this conduit is connected with working chamber 33a through conduit 37, axial passage 39, radial passages 41 and conduit 34, so too does the pressure in the working chamber. Therefore, motor 33 shifts valve plunger 24 to the right to its low speed position thereby disconnecting conduit 19a from conduit 18 and connecting it with conduit 19. As a result, the fluid delivered by pump 11 is conveyed to the rod end of cylinder 13 and the oil displaced from the head end is transmitted to the tank 12 through the directional control valve 14. The by-pass valve 15 will remain in the high speed position as long as conduit 19 is pressurized, and consequently the retraction speed of cylinder 13 is substantially constant.

In the preferred embodiment of the invention shown in FIGS. 2, 3 and 4, the by-pass and vent valves 15 and 36, respectively, and the two relief valves 35 and 45 are incorporated in a single housing 46. The corresponding parts of the two embodiments are identified by the same reference numerals and their modes of operation are identical, so detailed description of the preferred regenerative device would be superfluous. However, it might be helpful to mention that in the preferred embodiment the relief valves 35 and 45 and the conduit 44 communicate directly with the chamber 25, rather than with the conduit connected to port 16, and that the conduit 37 communicates directly with the chamber 27. I might also point out that valve land 28 of the by-pass valve is split into two sections by a peripheral groove 31a in order to reduce the resistance to flow through chamber 25.

While, from a theoretical standpoint, the ratio of the cracking pressure of relief valve 35 to the cracking pressure of relief valve 45 need be only slightly greater than the ratio of the area of head end of cylinder 13 to the area of the piston rod 13a, it should be realized that as a practical matter a wider safety margin is required. The 200 p.s.i. margin provided in the illustrated embodiment is considered representative. It should also be noted that since the cracking pressure of each of the relief valves 35 and 45 can be changed simply by repositioning the seat (see seat 35a in FIG. 4) of the biasing spring, the differential between the pressures which initiate low and high speed operation can be varied at will. This makes possible use of the improved regenerative device in systems having different operating requirements and employing cylinders of various dimensions.

As stated previously, the drawing and description relate only to the preferred embodiment of the invention. Since changes can be made in the structure of this embodiment without departing from the inventive concept, the following claims should provide the sole measure of the scope of the invention.

What I claim is:
1. In combination
   (a) three flow passages;
   (b) a shuttle valve connected with the three passages and having first and second positions in which it connects the third passage with the first and second passages, respectively;
   (c) means biasing the shuttle valve toward the first position;
   (d) a fluid pressure motor, including a working chamber, for shifting the shuttle valve to the second position;
   (e) a fourth passage connecting the working chamber with the second passage;
   (f) a vent valve controlling flow through the fourth passage and shiftable between open and closed positions;
   (g) means biasing the vent valve toward open position;
   (h) a fifth passage interconnecting the first and second passages;
   (i) a relief valve interposed in the fifth passage and responsive to the pressure in the first passage;
   (j) means responsive to flow through the fifth passage for shifting the vent valve to closed position; and
   (k) means, including a second relief valve, connecting the first passage with the working chamber, this relief valve also being responsive to the pressure in the first passage.

2. A hydraulic valving device comprising a housing containing
   (a) four ports;
   (b) a first passage interconnecting the first and fourth ports, a second passage connected with the second port, and a third passage connected with the third port;
   (c) a shuttle valve shiftable between first and second positions in which it connects the third passage with the first and second passages, respectively;
   (d) a spring biasing the shuttle valve toward the first position;
   (e) a piston motor, including a working chamber, for shifting the shuttle valve to the second position;
   (f) a fourth passage connecting the working chamber with the second passage;
   (g) a vent valve controlling flow through the fourth passage and shiftable between open and closed positions;
   (h) a second spring biasing the vent valve toward the open position;

(i) a fifth passage interconnecting the first and second passages;
(j) an adjustable relief valve interposed in the fifth passage and responsive to the pressure in the first passage;
(k) a metering orifice interposed in the fifth passage between the relief valve and the junction with the second passage;
(l) means responsive to the pressure drop across the metering orifice for shifting the vent valve to closed position; and
(m) means, including a second adjustable relief valve, connecting the first passage with the working chamber, the second relief valve also being responsive to the pressure in the first passage.

No references cited.

WILLIAM F. O'DEA, *Primary Examiner.*

H. M. COHN, *Assistant Examiner.*